July 12, 1966     A. E. RELATION ET AL     3,260,963
INVERTER HAVING CIRCUITRY FOR CONTROLLING THE RELATIVE
DURATION OF THE OUTPUT ALTERATIONS
Original Filed April 20, 1961

WITNESSES:
Bernard R. Gieguay
James T. Young

INVENTORS
Alfred E. Relation, John F. Roesel, Jr.
and Rudy P. Putkovich.
BY John L. Houghton
ATTORNEY United States Patent Office 3,260,963
Patented July 12, 1966

3,260,963
INVERTER HAVING CIRCUITRY FOR CONTROLLING THE RELATIVE DURATION OF THE OUTPUT ALTERNATIONS
Alfred E. Relation, Media, and Rudy P. Putkovich, Franklin Township, Export, Pa., and John F. Roesel, Jr., Sarasota, Fla., assignors to Westinghouse Electric Corporation, Pittsburgh, Pa., a corporation of Pennsylvania
Continuation of application Ser. No. 104,338, Apr. 20, 1961. This application Aug. 18, 1964, Ser. No. 391,830
15 Claims. (Cl. 331—113)

The invention relates generally to control systems for inverter network, and more particularly to such a control system in which the half cycles of each polarity of the output potential of the inverter may be made of equal length and is a continuation of our copending application Serial No. 104,338, filed April 20, 1961, for Inverter Control System, now abandoned.

A principal object of our invention is to provide a new and improved inverter network of the character described.

A further object of our invention is to provide such an inverter in which the output voltage wave will be balanced and the second harmonic substantially eliminated.

Another object of our invention is to provide such a network which will compensate for the differences in the individual valve devices which are used to control current in the main current path.

Other objects will be apparent from the description, the appended claims and the drawing in which:

Figure 1:
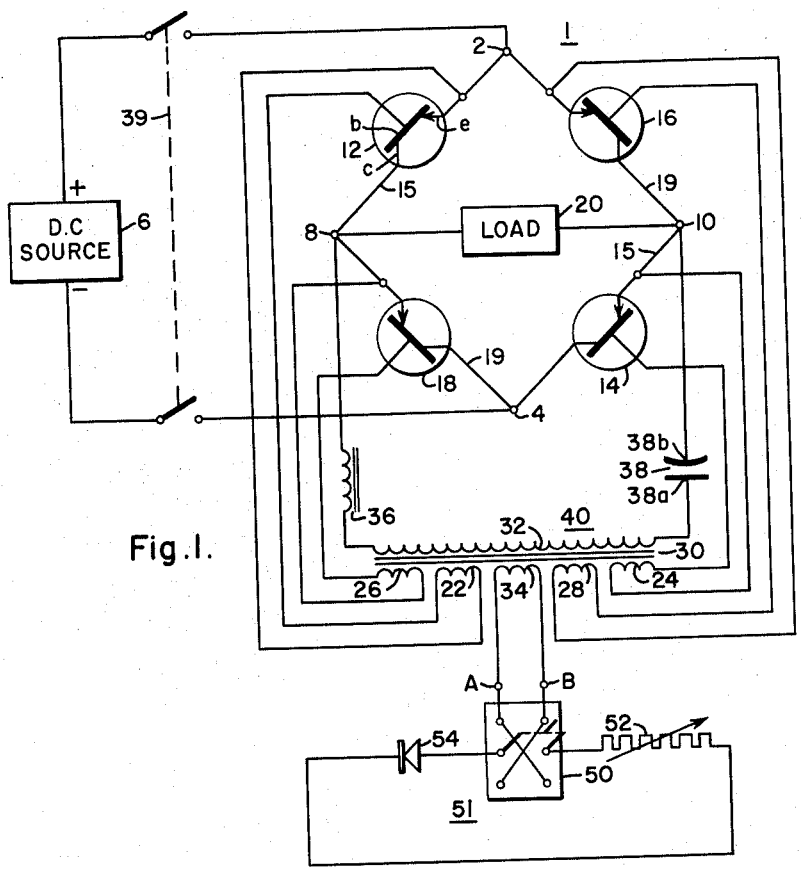
FIGURE 1 illustrates schematically an inverter embodying the invention.

Referring to the drawing by characters of reference the numeral 1 indicates generally an inverter network having a pair of input terminals 2 and 4, adapted to be connected to a suitable source of direct current potential 6, and a pair of output terminals 8 and 10 which are energized in alternating of polarity by means of current paths which interconnect these terminals to the input terminals 2 and 4.

More specifically, the inverter may take the form of a bridge type network in which semiconductor devices 12 and 14 are connected between the terminals 2 and 8 and the terminals 10 and 4 respectively and provide a first current path 15 interconnecting the input and output pair of terminals. Similarly, semiconductive devices 16 and 18 are connected respectively between the terminals 2 and 10 and 8 and 4 and provide the second path 19. The load device 20 is connected between the ouput terminals 8 and 10.

Each of the semiconductor devices 12, 14, 16 and 18 is provided with a power circuit and a control circuit which controls the current through its respective power circuit. The power circuit of each device 12, 14, 16 and 18 comprises the emitter $e$ and collector $c$ and the current flow therethrough is controlled by a control current which flows between the base $b$ and the emitter $e$. While in most instances it is preferable to provide the control of the current flow through the main path of the semiconductor device by a circuit connected between the base $b$ and emitter $e$, in some instances it may be desirable to control by a current flow between the base $b$ and the collector C. The control current for the semiconductor device 12, 14, 16 and 18 is obtained from the secondary windings 22, 24, 26 and 28, respectively of the control transformer 30 to which they are individually connected and constitutes a loading means for the oscillatory circuit 40. The transformer 30 is provided with a primary winding 32 connected between the terminals 8 and 10 in series with an inductive device 36 and a capacitive device such as capacitor 38. An additional secondary winding 34 is provided on the transformer 30 for a purpose which will be explained in greater detail below. The control circuit comprising the winding 32, inductive device 36 and capacitor 38 is an LRC circuit 40 which has a normal period of oscillation determined by the relative magnitude of L (inductance) R (resistance) and C (capacitance).

Upon closure of the switch 39 current will flow through one of the paths 15 or 19 in slightly greater magnitude than it will through the other of these paths to make one of the output terminals 8 or 10 positive with respect to the other thereof. Which path will conduct the most depends upon a myriad of factors but for the purpose of discussion it will be assumed that the greater current flows through the path 15 resulting in the terminal 8 being made positive with respect to terminal 10. This causes current to flow through the device 36, winding 32, and capacitor 38 in a direction to energize the output windings 22 and 24 in a polarity to cause the devices 12 and 14 to conduct and to energize the output windings 26 and 28 in a polarity to cause the devices 16 and 18 to refrain from conduction. The devices 12 and 14 are almost instantaneously driven to saturation and the path 15 rendered fully conducting to energize the load 20 and transformer 30 in a first polarity. Because of the low value of R with respect to the inductance L, the current continues to flow into the capacity C after it has charged to the potential between the terminals 8 and 10 and the charge on the capacitor 38 will continue to increase by virtue of the collapsing flux in the inductance L. Eventually the current in the LRC circuit will reverse and reverse the output potential of the windings 22, 24, 26 and 28. This results in the removal of the control current flow in a conducting direction in the control circuits of the devices 12 and 14 and the initiation of the control current flow in a conducting direction in the control circuits of the devices 16 and 18 whereby the path 19 is rendered fully conductive and the path 15 rendered nonconductive to reverse the polarity of energization of the terminals 8 and 10. Control current again continues to flow in the LRC circuit as described above until the capacitor 38 is charged to some potential above that appearing between the terminals 8 and 10, at which time it will reverse to render path 15 conductive and path 19 will revert to a non-conductive condition. The foregoing alternate rendering of the paths 15 and 19 will continue until opening of the switch 39.

The primary winding 32 will reflect the impedances of the control circuits of the semiconductor devices 12, 14, 16 and 18. Since this impedance is primarily resistive in nature the winding 32 will exhibit primarily resistive characteristics. The reflected resistance is in effect the parallel sum of the resistances of the control circuits of a junction of the several semiconductor devices 12, 14, 16 and 18. Due to the fact that the impedance of the individual control circuits of the devices 12, 14, 16 and 18 will vary from device to device as well as from changes in the polarity of energization, the reflected or apparent resistance will usually be greater at one polarity than at the opposite polarity. This change in the value of R of the LRC circuit will change the time of a half cycle of oscillations as a function of the change in the value of R. This is mathematically expressed by the equation $$f_0 = \frac{1}{2\pi}\sqrt{\frac{1}{LC} - \frac{R^2}{4L^2}}$$

in instances wherein the quantity beneath beneath the radical sign is a positive or real quantity as for example in those instances in which $$\frac{R^2}{4L^2} < \frac{1}{LC}$$

or in other words $$R < \sqrt{\frac{4L}{C}}$$

which is the oscillating condition of an LRC circuit. This causes a current flow through the control circuit 40 comprising the elements 32, 36 and 38 and the capacitor 38 begins to become charged due to current flow through the inductive device 36 and the primary winding 32. Due to the face that the value of R as reflected by the transformer 30 is greater in one polarity than in the opposite polarity of its energization the oscillating frequency of the LRC network will vary depending upon the polarity of the half cycle. With this type of operation a second harmonic will be present at the terminals 8 and 10. This is undesirable and attends to cause undesired operation of any inductive device energized thereby. This second harmonic may be substantially eliminated by maintaining the value R substantially constant independently of the direction of current flow in the LRC circuit.

In accordance with this invention the output terminals A and B of the winding 34 are connected through a reversing switch 50 to a series network 51 comprising a variable resistor 52 and a rectifier 54. At one polarity of the potential applied to the series network 51, current will flow in a forward direction through the rectifier 54 and the variable resistor 52 decreasing the value of the reflected resistance R in the LRC circuit. With potential of the opposite polarity applied to the network 51, the effective resistance is very high and due to its being in parallel relation with the resistance of the other secondary winding 22, 24, 26 and 28 it will make little if any difference in the reflected value of R. Therefore if the switch 50 is positioned to provide the series network 51 with its "one polarity" during the time that the reflected value of the resistances of the control circuits of the devices 12, 14, 16 and 18 is at the lesser value the magnitude of the resistance of the resistor 52 may be adjusted so that the reflected value thereof is is equal to the unbalance in the control circuits to thereby make R constant for each polarity of energization of the transformer 30. With this arrangement the length of the half cycle of one polarity are exactly the same as those of the other half cycle and the second as well as the other even harmonics will be substantially eliminated.

Figure 2:
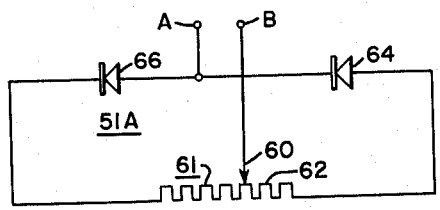
FIG. 2 is a view of a portion of the inverter of FIG. 1 showing a modified form of the invention.

In FIG. 2 there is shown another form of corrective network 51A which may be connected to the terminals A and B of the winding 34 in place of the network 51 shown in FIG. 1. In this instance, the terminal B is connected to the slider 60 of a potentiometer 61 while the terminals of the resistance winding 62 are individually connected to the terminal A through rectifiers 64 and 66 respectively. By properly adjusting the slide 60 on the resistance element 62, the network 51A may be made to add an equal and opposite unbalanced reflected resistance to balance that of the windings 22, 24, 26 and 28 so that R will remain constant and the inverter network will oscillate at equal time periods thereby eliminating the second and other even harmonics which might otherwise appear between the output terminals 8 and 10.

Although the invention has been described with reference to certain specific embodiments thereof, numerous modifications are possible and it is desired to cover all modifications falling within the spirit and scope of the invention.

What is claimed and is desired to be secured by United States Letters Patent is as follows:

1. In an inverting network, a pair of input terminals adapted to be connected to a source of unidirectional potential, a pair of output terminals, first and second current paths interconnecting said pairs of terminals, each said path including at least one valve device actuable between current conducting and current interrupting conditions whereby each said path is rendered conducting and nonconducting, said first path being effective to connect said input terminals to said output terminals in a first polarity, said second path being effective to connect said input terminals to said output terminals in a second polarity, circuit means providing a feedback voltage for said valve devices, said circuit means being connected for energization by a potential derived from the potential across said output terminals, said circuit means including a portion connected to said valve devices for alternately actuating said valve devices and thereby rendering said paths effective to alternately conduct and alternately energize said output terminals, said circuit means further comprising an oscillating circuit having inductance and capacitance connected for oscillatory current flow therebetween, and a network connected to said circuit means and energized by said oscillatory current flow, said network including an asymmetric resistive device, the magnitude of the total resistance (R) and the magnitude of the inductance (L) and of the magnitude of the capacitance (C) of said oscillating circuit being such as to satisfy the relationship $R^2/4L^2 < 1/LC$.

2. In an inverting network, a pair of input terminals adapted to be connected to a source of unidirectional potential, a pair of output terminals, first and second current paths connected to said output terminals, each said path including at least one valve device having a current conducting and a current interrupting condition for determining the conducting and non-conducting condition of its respective said path, one of said paths connecting said input terminals to said output terminals to provide current flow between said output terminals in a first direction, the other of said paths being effective in its said conducting condition to provide current flow between said output terminals in a second direction, a transformer having an output winding and an input winding, an oscillating network connected for energization by a potential which is a function of the potential across said output terminals, means connecting said oscillating network to said valve devices for alternately actuating said valve devices whereby said paths are alternately rendered effective to permit current flow in opposite directions between said output terminals, said oscillating network including said input winding connected in series with an inductance and a capacitance whereby current may oscillate between said inductance and said capacitance through said input winding, and a network connected to said output winding, said network including an asymmetric energy consuming current flow device.

3. In an inverting network, a pair of input terminals adapted to be connected to a source of unidirectional potential, a pair of output terminals, first and second current paths interconnecting said pairs of terminals, each said path including at least one valve device having a current conducting and a current interrupting condition said device including control means for actuating said device from one of said conditions to the other of said conditions, said first path being effective to connect said input terminals to said output terminals in a first polarity, said second path being effective to connect said input terminals to said output terminals in a second polarity, a transformer having an output winding and an input winding, an oscillating network comprising an inductance element and a capacitance element and said input winding, said inductance element being connected to said capacitance element for the oscillatory flow of current therebetween, said input winding being connected to at least one of said elements whereby current flows through said input winding in alternating directions as the charged condition of said one element reverses in polarity, means connecting said oscillating network to said input terminals and including at least one of said paths whereby said oscillating network is supplied with a potential which pulses at a frequency which is a function of the frequency of the potential at said output terminals, means connecting said oscillating network to said control means of said valve devices whereby the conductive condition of said valve devices are alternately changed to thereby render said paths alternately conductive to alternatingly energize said output terminals, and a network connected across said output winding, said network including an asymmetric energy consuming device.

4. In an inverting network, a pair of input terminals adapted to be connected to a source of unidirectional potential, a pair of output terminals, a plurality of valve devices, each said device having a main curent path and a control circuit for controlling the flow of current through its said main path, first and second current paths, said first path being effective to connect said input terminals to said output terminals in a first polarity, said second path being effective to connect said input terminals to said output terminals in a second polarity, each said path interconnecting said pairs of terminals, each said path including said main circuit of at least one valve device and effective in one conductive condition of its said valve device to energize said output terminals, a transformer having an output winding means and an input winding means, inductive reactance, capacitive reactance, means connecting said reactances and said input winding means in series circuit for oscillatory flow of electrical energy between said reactances through said input winding means, means connecting said series circuit to said paths for supply of electrical energy from said pair of input terminals to said series circuit in alternating polarity as said paths are rendered effective, a control circuit energized from said output winding means and connected to said control circuits of said valve devices for alternately rendering said paths effective to energize said output terminals, said first path being operable when effective to energize said output terminals in a first polarity and said second path being operable when effective to energize said output terminals in an opposite polarity, an asymmetric energy absorbing device, and means connecting said energy absorbing device in series with at least a portion of one of said winding means.

5. The combination of claim 4 in which said asymmetric energy device comprises a resistor connected in series with a rectifying device.

6. The combination of claim 4 in which said asymmertic energy device comprises a pair of circuits independently connected in series with said one winding means in parallel with each other, each circuit of said pair comprises a resistive load connected in series with a rectifying device, said resistive loads being of unequal magnitude, and said rectifying devices being oppositely poled.

7. In an inverter, a pair of input terminals adapted to be energized from a source of unidirectional potential, a pair of output terminals, first and second valve devices, each said device having a main power circuit and a control circuit, a first power path including said main power circuit of said first valve device connecting said input terminals to said output terminals, a second power path including said main power circuit of said second valve device connecting said input terminals and said output terminals, said first path being effective to connect said input terminals to said output terminals in a first polarity, said second path being effective to connect said input terminals to said output terminals in a second polarity, an oscillating control circuit energized from said input terminals through at least a portion of each said path, said oscillating circuit including a plurality of series connected elements, one of said elements being a transformer, a second of said elements being a capacitor, a third of said elements being an inductor, said transformer having a first and second plurality of output terminals, means connecting said transformer first terminals to said control circuits to alternately change the conductive condition of said valve device as a consequence of the alternating energization of the transformer by the flow of current between the capacitor and inductor, a resistor, an asymmetric device, means connecting said resistor and asymmetric current controlling device to said transformer second terminals for asymmetric current flow through said resistor.

8. In an inverter, a pair of input terminals adapted to be energized from a source of unidirectional potential, a pair of output terminals, a plurality of valve devices, each said device having a main power circuit and a control circuit for controlling the initiation of current flow in its said associated main circuit, means connecting said main power circuit of a first of said valve devices between one of said input terminals and one of said output terminals, means connecting said main power circuit of a second of said valve devices between said one input terminal and the other of said output terminals, means connecting a third of said valve devices between said one output terminal and the other of said input terminals, means connecting a fourth of said valve devices between said other output terminal and said other input terminal, an oscillating control circuit connected to said output terminals and including a plurality of series connected impedance elements, one of said impedance elements being a transformer, a second of said elements being a capacitor, a third of said elements being an inductor, said transformer having output windings, circuit means individually connecting certain of said transformer output windings to said control circuits of said valve devices, said last named circuit means connecting said certain output windings in a polarity to render said first and fourth valve device conducting in alternating relation with said second and third valve devices, first resistive means, and means including a first asymmetric device connecting said first resistive means across another of said output windings.

9. In an inverter, a pair of input terminals adapted to be energized from a source of unidirectional potential, a pair of output terminals, first and second valve devices, each said device having a main power circuit and a control circuit, a first power path including said main power circuit of said first valve device connecting said input terminals to said output terminals, a second power path including said main power circuit of said second valve device connecting said input terminals and said output terminals, an oscillating control circuit energized from said input terminals through at least a portion of each said path, said oscillating circuit including a plurality of series connected elements, one of said elements being a transformer, a second of said elements being a capacitor, a third of said elements being an inductor, said transformer having a first and second plurality of output terminals, means connecting said transformer first terminals to said control circuits to alternately change the conductive condition of said valve devices as a consequence of the alternating potential energization of the transformer by the flow of current between the capacitor and inductor, a resistor, an asymmetric device, means connecting said resistor and asymmetric current controlling device to said transformer second terminals for asymmetric current flow between said second terminals.

10. In an inverter, a pair of input terminals adapted to be energized from a source of unidirectional potential, a pair of output terminals, first and second valve devices, each said device having a main power circuit and a control circuit, means connecting said main power circuit of said first valve device between one of said input terminals and one of said output terminals, means connecting said main power circuit of said second valve device between said one input terminal and the other of said output terminals, a third valve device having a power circuit connected between said one output terminal and the other of said input terminals, a fourth valve device having a power circuit connected between said other output terminal and said other input terminal, each said third and said fourth valve device having a control circuit controlling the initiation of current flow through its respective said power circuit, an oscillating control circuit connected to said output terminals and including a plurality of series connected impedance elements, one of said impedance elements being a transformer, a second of said elements being a capacitor, a third of said elements being an inductor, said transformer having output terminals, circuit means connecting certain of said transformer terminals to said control circuits, first and second resistive portions with electrically spaced terminals, first and second asymmetric devices, means connecting said first asymmetric device in series with said first resistive portion between two of said transformer terminals, and means connecting said second asymmetric device in series with said second resistive portion between a pair of said transformer terminals, said asymmetric devices being oppositely poled with respect to the alternating flux of said transformer.

11. In an inverter, a pair of input terminals adapted to be energized from a source of unidirectional potential, a pair of output terminals, first and second valve devices, each said device having a main power circuit and a control circuit, means connecting said main power circuit of said first valve device between one of said input terminals and one of said output terminals, means connecting said main power circuit of said second valve device between said one input terminal and the other of said output terminals, a third valve device having a power circuit connected between said one output terminal and the other of said input terminals, a fourth valve device having a power circuit connected between said other output terminal and said other input terminal, each said third and said fourth valve device having a control circuit controlling the initiation of current flow through its respective said power circuit, a control circuit connected between said output terminals and including a plurality of series connected impedance elements, one of said impedance elements being a transformer, a second of said elements being a capacitor, a third of said elements being an inductor, said transformer having output terminals, means connecting certain of said transformer terminals to said control circuits of said valve devices, a potentiometer device having a resistive element with electrically spaced terminals and a means for making electrical connection with a portion of said resistive element, means including a first asymmetric device connecting a first of said resistive element terminals to one of said transformer terminals, means including a second asymmetric device connecting a second of said resistive element terminals to said one transformer terminal, and means connecting said electrical connection means to a second of said transformer terminals, said asymmetric devices being oppositely poled with respect to the alternating flux of said transformer.

12. An oscillating control network comprising inductive reactive impedance (L) and capacitive reactive impedance (C) connected in series circuit with each other to permit the flow of oscillating energy between said reactive impedances in first and second directions, means connected to said series circuit and controlled by the flow of said oscillating energy for supplying periodic pulses of electrical energy to said series circuit to maintain oscillation of electrical energy therein, and means spaced from said last-named means and introducing asymmetric resistance into said series circuit so that at least a portion of said oscillating energy flows through said resistance, the total value of resistance (R) in said oscillating network being such as to satisfy the relationship $R^2/4L^2 < 1/LC$ whereby the series circuit will oscillate, said asymmetric resistance introducing a greater value of resistance to current flow in a first direction than in a second direction whereby the time interval of the flow of energy in one of said directions is changed from that in the other of said directions.

13. An oscillating network comprising a pair of control circuit terminals, a capacitor, an inductance, an asymmetric current conducting circuit including resistance, a control circuit connected between said control circuit terminals and including said capacitor and said inductance in series circuit with each other, said control circuit further including said asymmetric circuit effectively connected to said series circuit and effectively in series with a portion thereof to provide a greater impedance to current flow through said series circuit when said energy flows therethrough in a first direction than when said energy flows therethrough in a second direction, a source of electrical energy, a switching network connecting said source to said control circuit terminals, and control means spaced from said asymmetric circuit and interconnecting said control circuit to said switching network, said control means being actuated in response to the direction of flow of said energy in said series circuit to actuate said switching network to connect and disconnect said source to said terminals and thereby to periodically supply electrical energy to said series circuit.

14. An oscillating network comprising a capacitor, an inductance, a transformer having a plurality of windings, a current path connecting said capacitor and said inductance and a first of said transformer windings in series circuit whereby the oscillating current between said capacitor and said inductance flows through said first winding in first and second directions, a loading means connected to certain other of said windings, said loading means including an asymmetrical power component, an asymmetric current conducting circuit including resistance, and means connecting said asymmetric circuit to one of said windings in a polarity to insert asymmetric resistance into said series circuit to balance said asymmetrical power component of said loading means.

15. The combination of claim 14 in which said asymmetric circuit comprises a rectifier series connected with a resistor.

References Cited by the Examiner

UNITED STATES PATENTS

| | | | |
|---|---|---|---|
| 2,817,057 | 12/1957 | Hollmann | 323—60 |
| 2,878,382 | 3/1959 | Creveling | 328—223 X |
| 2,894,210 | 7/1959 | Erb | 331—113 |
| 2,905,906 | 9/1959 | Kittl | 331—113.1 |
| 2,931,971 | 4/1960 | May | 323—88 X |
| 2,971,166 | 2/1961 | Schultz | 331—113.1 |
| 3,009,115 | 11/1961 | Johnson | 331—113.2 X |
| 3,048,764 | 8/1962 | Murphy | 331—113.1 X |
| 3,119,047 | 1/1964 | Michalski | 331—170 X |
| 3,129,374 | 4/1964 | Relation et al. | 331—113 X |

FOREIGN PATENTS 1,194,232   4/1958   France.

OTHER REFERENCES

Hurley, "Designing Transistor Circuits—Sinusoidal Oscillators—Part 2", Electronic Equipment, October 1957, pages—20–27 (pages 20 and 26 relied on).

Ryder, Electronic Fundamentals and Applications, Second Edition, 1959, Prentice-Hall, Inc., Englewood Cliffs, N.J., pages 402 and 403.

NATHAN KAUFMAN, *Primary Examiner.*

JOHN KOMINSKI, ROY LAKE, *Examiners.*

J. B. MULLINS, *Assistant Examiner.*